United States Patent
Battles et al.

(10) Patent No.: US 8,328,200 B2
(45) Date of Patent: Dec. 11, 2012

(54) MULTIPLE USE INSTALLATION AID FOR RADIAL SHAFT SEALS

(75) Inventors: Darin Battles, Dahlonega, GA (US); John A. London, Cornelia, GA (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 327 days.

(21) Appl. No.: 12/765,409

(22) Filed: Apr. 22, 2010

(65) Prior Publication Data

US 2011/0260409 A1 Oct. 27, 2011

(51) Int. Cl.
*F16J 15/32* (2006.01)
(52) U.S. Cl. ........................... 277/551; 277/572
(58) Field of Classification Search .................. 277/551, 277/571, 576–577
See application file for complete search history.

(56) References Cited

U.S. PATENT DOCUMENTS

| | | | |
|---|---|---|---|
| 2,860,535 A | 11/1958 | Fowler | |
| 3,030,702 A | 4/1962 | Fowler | |
| 3,165,949 A | 1/1965 | Thill | |
| 3,947,944 A * | 4/1976 | Washington | 29/235 |
| 4,218,813 A * | 8/1980 | Cather, Jr. | 29/450 |
| 4,551,898 A * | 11/1985 | Provost | 29/235 |
| 4,815,884 A | 3/1989 | Halliday, Jr. et al. | |
| 5,052,695 A * | 10/1991 | Curtis | 29/235 |
| 5,503,404 A * | 4/1996 | Newton et al. | 277/551 |
| 6,918,592 B2 * | 7/2005 | Feigl | 277/370 |
| 7,059,608 B2 * | 6/2006 | Ramsay | 277/551 |
| 7,284,759 B2 | 10/2007 | Heldmann et al. | |
| 7,651,102 B2 | 1/2010 | Heldmann et al. | |
| 2005/0109889 A1* | 5/2005 | Heldmann et al. | 248/74.1 |
| 2005/0258181 A1* | 11/2005 | Heldmann et al. | 220/837 |

* cited by examiner

*Primary Examiner* — Vishal Patel
(74) *Attorney, Agent, or Firm* — Daniel J. Sepanik, Esq.; Harness, Dickey & Pierce, P.L.C.

(57) ABSTRACT

A shaft-sealing device comprising a sealing ring having a seal secured thereto, and a protective member engaged with the sealing ring. The said protective member includes a cylindrical member having a shaft-engaging surface and a seal-engaging surface, and an annular flange extends radially away from the shaft. The shaft-engaging surface is operable to be attached to the shaft during operation of the device, and the seal-engaging surface is operable to be in sealing contact with the seal during operation of the device. The annular flange is operable to engage the sealing ring.

10 Claims, 3 Drawing Sheets

MULTIPLE USE INSTALLATION AID FOR RADIAL SHAFT SEALS

FIELD

The present disclosure relates to a device for installing a seal about a shaft to be sealed.

BACKGROUND

This section provides background information related to the present disclosure which is not necessarily prior art.

Radial shaft seals may be mounted to a shaft using an installation device that protects the seal during installation. Seals may require protection during installation so that the seal, which may be formed of a polymeric- or rubber-based material, is not damaged during installation. In this regard, for example, radial shaft seals may be mounted over a shaft having splines over a surface thereof (i.e., a shaft for use in a transmission that includes splines that may engage gears of the transmission). If the splines contact the seal during installation, the seal may become damaged, which reduces the efficacy of the seal during use thereof. The installation device, therefore, may serve as a protective device that is used in the mounting of the radial shaft seal onto the shaft. After mounting of the radial shaft seal, the installation/protection aid is manually removed from the shaft.

SUMMARY

This section provides a general summary of the disclosure, and is not a comprehensive disclosure of its full scope or all of its features.

A shaft-sealing device comprising a sealing ring having a seal secured thereto, and a protective member engaged with the sealing ring. The said protective member includes a cylindrical member having a shaft-engaging surface and a seal-engaging surface, and an annular flange extends radially away from the shaft. The shaft-engaging surface is operable to be press-fit to the shaft during operation of the device, and the seal-engaging surface is operable to be in sealing contact with the seal during operation of the device. The annular flange is operable to engage the sealing ring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
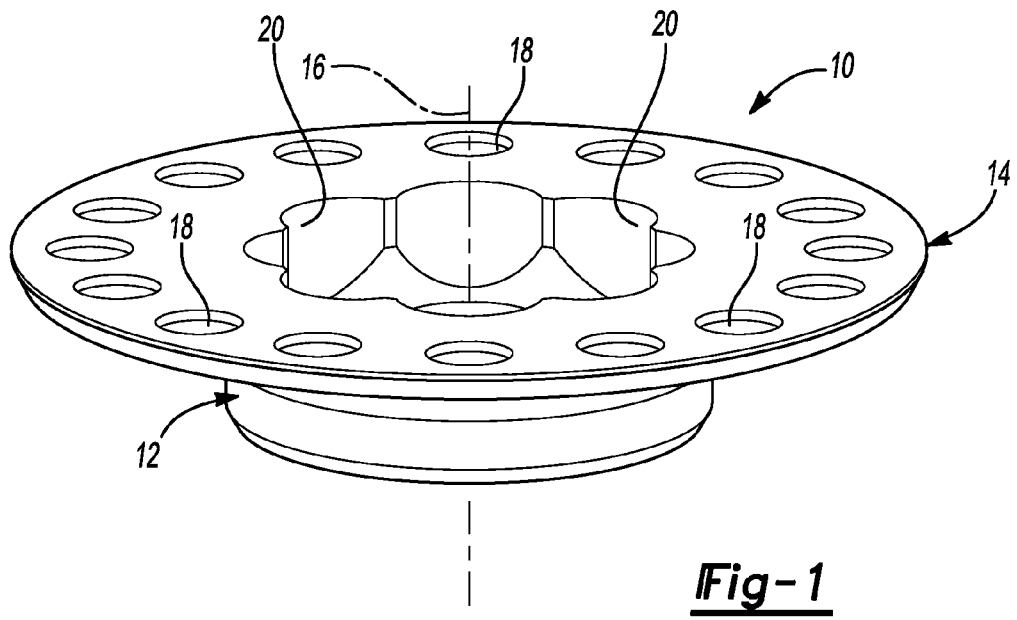
FIG. 1 is a perspective view of an installation aid for installing a radial shaft seal according to a principle of the present disclosure.
Figure 2:
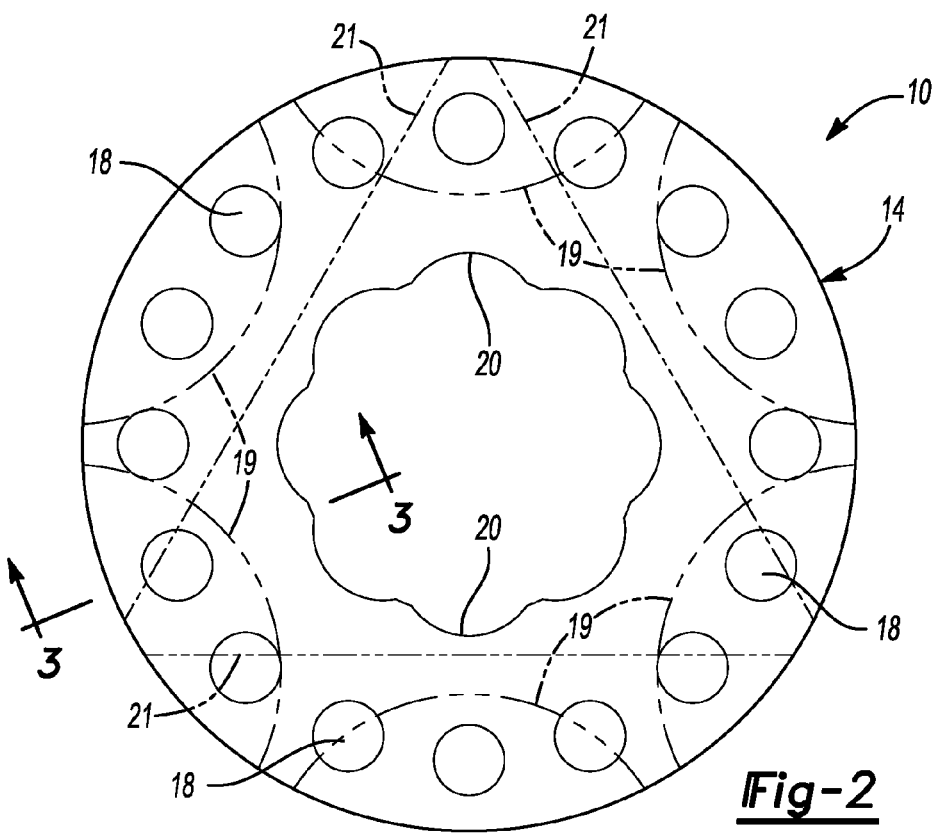
FIG. 2 is an axial view of the installation aid illustrated in FIG. 1.
Figure 3:
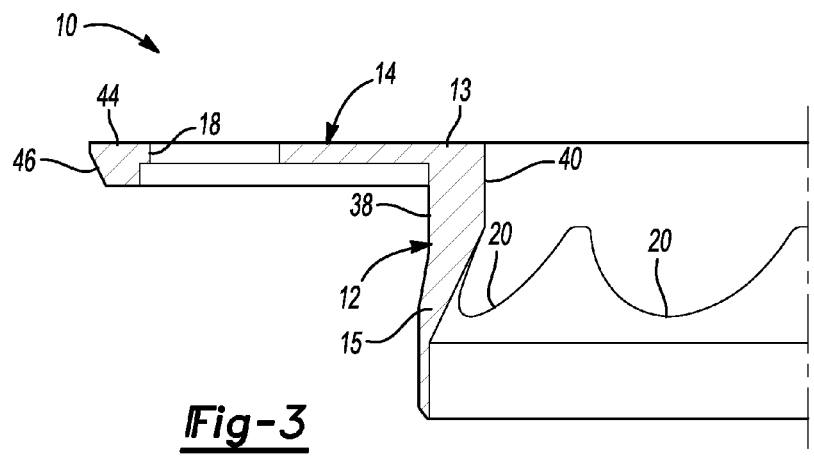
FIG. 3 is a partial cross-sectional view of the installation aid illustrated in FIGS. 1 and 2.

Example embodiments will now be described more fully with reference to the accompanying drawings.

FIGS. 1 to 5 illustrate an installation device 10 according to the present disclosure. Installation device 10 includes a cylindrical member 12 and an annular flange 14 extending radially from the cylindrical member 12. Annular flange 14 may be unitary with cylindrical member 12, and extends radially away from an axis 16 of installation device 10. Annular flange 14 may include a plurality of apertures 18 that enable a medium to be sealed, such as a lubricant, to pass there through.

Although annular flange 14 has been described as utilizing apertures 18 to allow lubricant to pass there through, the present disclosure should not be limited thereto. In lieu of apertures 18, annular flange 14 may include scalloped sections 19 removed there from. Another alternative includes providing annular flange 14 with a triangular shape. That is, sections 21 may be removed from annular flange 14 to provide flange 14 with a triangular shape. Regardless, flange 14 should provide passage for a lubricant.

Figure 5:
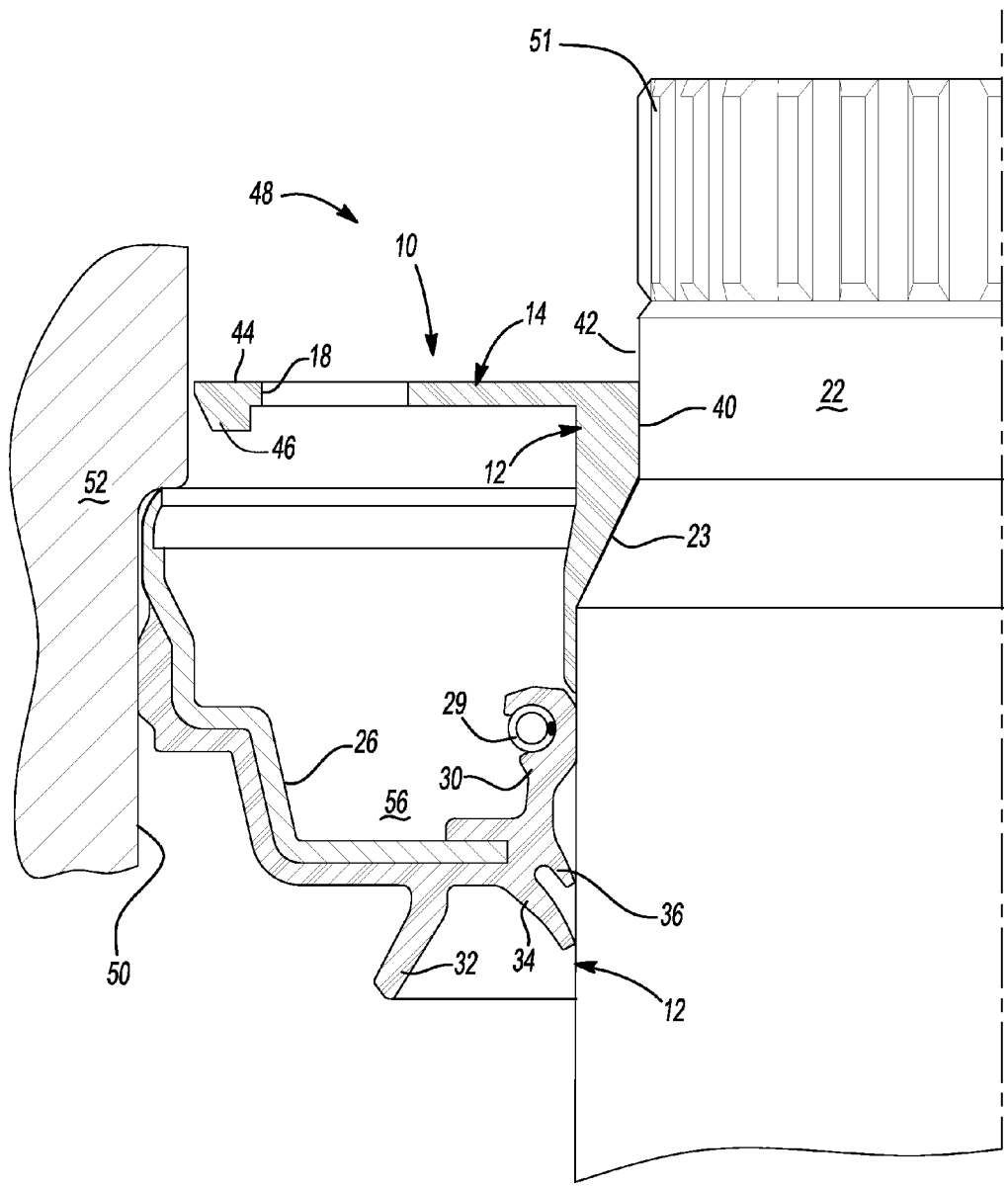
FIG. 5 is a partial cross-sectional view of the sealing ring and installation aid after insertion of a shaft to be sealed, and during operation of the seal.

Cylindrical member 12 may include a plurality of recesses 20 that may be lobe-shaped. Recesses 20 may be lobe-shaped in an axial direction. Lobe-shaped recesses 20 provide cylindrical member 12 with varying thicknesses in the axial direction such that portions 13 of cylindrical member 12 proximate annular flange 14 includes a greater thickness than portions 15 of cylindrical member 12 distal annular flange 14. Varying thicknesses of cylindrical member 12 with recesses 20 provides cylindrical member 12 with pliability, which enables installation device 10 to be press-fit to shaft 22 (FIG. 5).

Installation device 10 may be formed of any material known to one skilled in the art. Preferable materials for forming installation device 10 include plastic materials that are resistant to the medium to be sealed, as well as resistant to temperatures experienced during rotation of a shaft 22 to be sealed. That is, materials for forming installation device 10 should be resistant to temperatures experienced during operation of, for example, a transmission used in a motor vehicle, or other motor- or engine-based applications. Other materials contemplated include light-weight materials such as aluminum, titanium, and the like.

Figure 4:
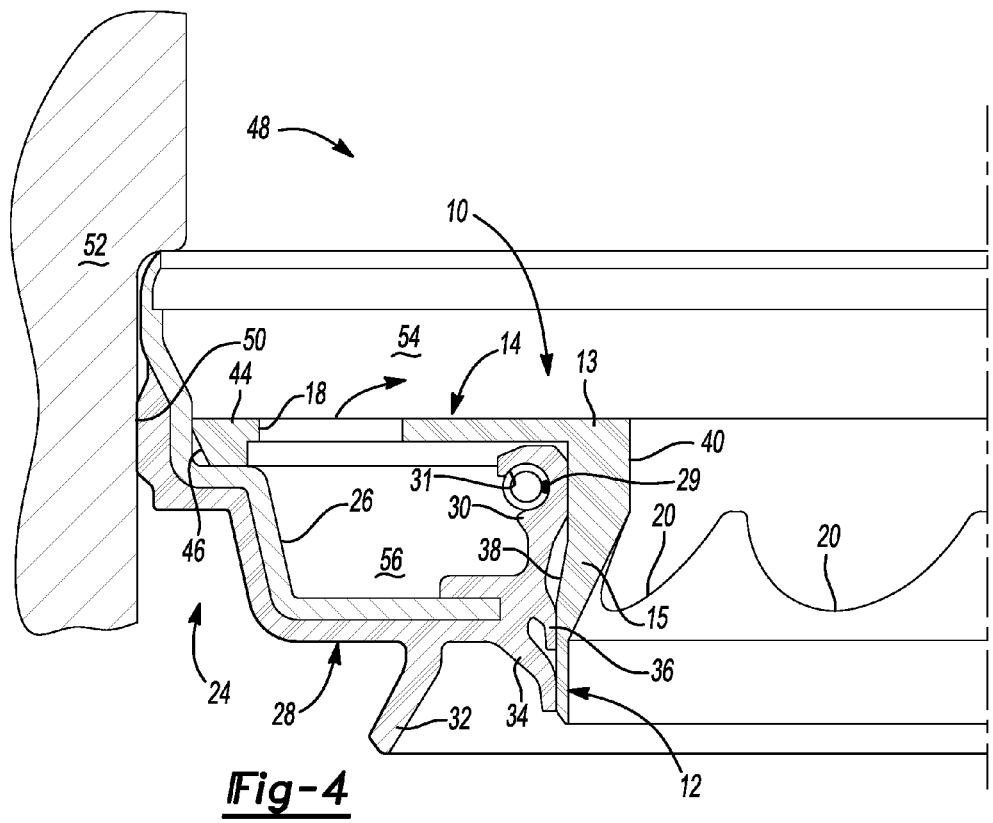
FIG. 4 is a partial cross-sectional view of the installation aid with a sealing ring secured thereto inserted into a housing prior to a shaft to be sealed being inserted into the housing according to a principle of the present disclosure.

Now referring to FIG. 4, installation device 10 is illustrated during operation thereof. In this regard, FIG. 4 illustrates installation device 10 with a sealing device 24 mounted thereto, after being inserted into a housing 52. Sealing device 24 includes a sealing ring 26, with a seal 28 mounted to sealing ring 26. Seal 28 may include a dynamic sealing lip 30 and a plurality of dust lips 32, 34, and 36. Dynamic sealing lip 30 engages a seal-contact surface 38 of cylindrical member 12, and includes a spring device 29 that tensions dynamic sealing lip 30 against seal-contact surface 38. A shaft-contact surface 40 of cylindrical member 12 engages a circumferential surface 42 of shaft 22 (FIG. 5).

To ensure sealing device 24 does not disengage from installation device 10 during mounting about shaft 22, annular flange 14 may include a thickened portion 44 located radially outward relative to apertures 18. Thickened portion 44 may include a chamfered surface 46, which increases the ease with which sealing ring 26 may be slid over annular flange 14.

Installation device 10 and sealing device 24 may form a pre-mountable unit 48. That is, sealing device 24 is first mounted to installation device 10, and then pre-mountable unit 48 is installed into housing 52. This decreases installation time in that pre-mountable unit 48 may be pre-assembled by the manufacturer prior to delivery to a customer that subsequently installs the unit 48 to housing 52 and shaft 22.

In addition, it should be appreciated and understood that installation device 10 is not removed from shaft 22 once shaft 22 is inserted into housing 52. That is, installation device 10 remains secured to shaft 22 during use of sealing device 24 for sealing shaft 22. Leaving installation device 10 secured to shaft 22 during use of sealing device 24 further decreases installation time in that no additional time is required to detach installation device 10 from shaft 22.

Installation device 10 protects sealing device 24 from damage when installing shaft 22 into housing 52 having unit 48 mounted therein. In this regard, shaft 22 may include splines 50 or other sharp-edged surfaces over a surface thereof. For example, shaft 22 may include splines 50 if shaft 22 is used in a transmission for a motor vehicle. Because dynamic sealing lip 30 and dust lips 32 and 34 are in contact with seal-contact surface 38 of installation device 10, however, splines 50 of shaft 22 are prevented from contacting dynamic sealing element 30 and dust lips 32 and 34, which in turn prevents damage thereto. Installation device 10, therefore, also serves as a guard device, in addition to assisting in installation of sealing device 24.

Once pre-mountable unit 48 is first mounted in housing 52, shaft 22 may be inserted into housing 52 through installation device 10. Shaft 22 may include a stepped surface 23. As shaft 22 passes through installation device 10, installation device 10 press-fits to stepped surface 23 of shaft 22 and disengages from sealing device 24 so that sealing lips 30, 34, and 36 sealingly contact shaft 22. That is, as device 10 becomes press-fit to shaft 22, device 10 will be pulled by shaft 22 axially away from sealing device 10. As device 10 is pulled axially away from sealing device 24, sealing lips 30, 34 and 36 will slide along seal-contact surface 38 until device 10 is entirely clear from sealing device 24. Lips 30, 34, and 36, therefore, will be free from seal-contact surface 38 to directly contact shaft 22 in a sealing manner. Installation device 10 does not interfere with operation of sealing device 24 because annular flange 14 includes apertures 18 that permit lubricant to pass from a space to be sealed 54 into a fluid chamber 56 defined by annular flange 14 and sealing ring 26.

If shaft 22 is to be removed from housing 52, shaft 22 with device 10 attached thereto will be pulled toward sealing device 24. As device 10 is pulled along with shaft 22, lips 30, 34, and 36 will re-engage with seal-contact surface 38 to re-form premountable unit 48. Because lips 30, 34, and 36 become re-engaged with seal-contact surface 38, lips 30, 34, and 36 are protected from splines 50 as shaft 22 is pulled free from housing 52.

Although installation device 10 has been described above as being press-fit to shaft 22, the present disclosure should not be limited thereto. That is, installation device 10 may include an adhesive (not shown) on shaft-contact surface 40. Alternatively, installation device 10 may include a cylindrical member 12 without recesses 20 that simply elastically stretches over shaft 22. Yet another alternative includes snap-fitting device 10 to shaft 22, as shaft 22 is inserted through device 10. Regardless, it should be understood and appreciated that device 10 attaches to shaft 22 as shaft 22 is inserted through device 10, and remains attached to shaft 22 during operation of seal 24.

Lastly, it should be understood that installation device 10 is operable in applications where either shaft 22 or sealing device 24 rotates. As stated above, installation device 10 may be press fit to shaft 22 to secure installation device 10 thereto. By press-fitting installation device 10 to shaft 22, shaft 22 and installation device 10 are fixed together, which enables rotation of device 10 along with shaft 22.

The foregoing description of the embodiments has been provided for purposes of illustration and description. It is not intended to be exhaustive or to limit the invention. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An assembly comprising:
   a housing defining a bore;
   a seal mounted in said bore, said seal including a retainer portion with an outer surface contacting the bore and an inner surface, the seal having at least one lip extending radially inward from said retainer portion;
   a shaft to be rotatably mounted in said bore and engaged by said at least one lip of said seal; and
   a mounting device including a cylindrical member having an axis, said cylindrical member defining an interior shaft-engaging surface having a stepped portion disposed therein and an exterior seal-engaging surface, wherein said stepped portion of said interior shaft-engaging surface is configured operable to be engaged by a shoulder of attached to the shaft during insertion of the shaft through said cylindrical member and into the housing, and said exterior seal-engaging surface is in contact with the at least one lip of said seal during insertion of the seal into the housing, said mounting device including an annular flange extending radially outward from said cylindrical member and engaging said inner surface of said retainer portion of the seal;
   wherein as the shaft is inserted through said cylindrical member into the housing and said shaft-engaging surface attaches to the shaft, said cylindrical member is moved axially away from the at least one lip of said seal and the annular flange is moved away from the retainer portion of the seal such that the at least one lip of said seal disengages with said seal-engaging surface and sealingly engages the shaft.

2. The device of claim 1, wherein said cylindrical member includes a plurality of lobe-shaped recesses that provide said cylindrical member with varying thicknesses that enable said shaft-engaging surface to be press-fit to the shaft.

3. The device of claim 1, wherein said annular flange includes a plurality of apertures that provide access for a medium to be sealed.

4. The device of claim 1, wherein said cylindrical member remains attached to the shaft during operation of the seal.

5. A shaft-sealing assembly, comprising:
   a housing defining a bore;
   a sealing ring having a retainer portion with an outer surface contacting the bore and at least one lip secured to the retainer portion;
   a shaft to be rotatably mounted in said bore and engaged by said at least one lip of said sealing ring; and
   a protective member engaged with said sealing ring, said protective member including a cylindrical member having an interior shaft-engaging surface and an exterior seal-engaging surface that is engaged by said at least one lip of said sealing ring, and an annular flange extending radially away from the shaft and engaged with said retainer portion of said sealing ring,
wherein as the shaft is inserted through said cylindrical member into the housing and said shaft-engaging surface of said cylindrical member attaches to the shaft, said cylindrical member is moved axially away from the at least one lip of said sealing ring and the annular flange is moved away from the retainer portion of the sealing ring such that the at least one lip of said sealing ring disengages with said seal-engaging surface and sealingly engages the shaft;
wherein said shaft-engaging surface is configured operable to be attached to the shaft during rotation of the shaft after the shaft and seal are assembled in the housing; and
said seal-engaging surface disengages from said seal during insertion of the shaft into the housing and re-engages with said seal during removal of the shaft from the housing.

6. The device of claim 5, wherein said cylindrical member includes a plurality of lobe-shaped recesses that provide said cylindrical member with varying thicknesses that enable said shaft-engaging surface to be press-fit to the shaft.

7. The device of claim 5, wherein said annular flange includes a plurality of apertures that provide access for a medium to be sealed.

8. The device of claim 5, wherein said seal includes a dynamic sealing element that seals a space to be sealed from an exterior environment.

9. The device of claim 5, wherein as the shaft is inserted into the housing and said shaft-engaging surface is attached to the shaft, said cylindrical member is pulled axially away from said seal such that said seal sealingly engages the shaft.

10. The device of claim 9, wherein said cylindrical member is pulled axially in a direction toward a space to be sealed.

* * * * *

UNITED STATES PATENT AND TRADEMARK OFFICE
CERTIFICATE OF CORRECTION

PATENT NO. : 8,328,200 B2  
APPLICATION NO. : 12/765409  
DATED : December 11, 2012  
INVENTOR(S) : Darin Battles et al.

Page 1 of 1

It is certified that error appears in the above-identified patent and that said Letters Patent is hereby corrected as shown below:

At column 5, claim number 5, line number 15, after "wherein said shaft-engaging surface is configured," the word "operable" should be deleted.

Signed and Sealed this  
Nineteenth Day of February, 2013

Teresa Stanek Rea  
*Acting Director of the United States Patent and Trademark Office*